United States Patent [19]
Lazarus

[11] 3,856,405
[45] Dec. 24, 1974

[54] METHOD FOR COLOR TEMPERATURE CALIBRATION OF TUNGSTEN

[75] Inventor: Martin Lazarus, Dover, N.J.

[73] Assignee: The United States of America as represented by the Secretary of the Army, Washington, D.C.

[22] Filed: Jan. 25, 1974

[21] Appl. No.: 436,581

[52] U.S. Cl..................... 356/46, 250/226, 356/222
[51] Int. Cl. ......... G01j 3/34, G01j 3/50, G01j 5/52
[58] Field of Search ....... 356/179, 184, 46, 47, 190, 356/195, 222; 250/226, 209, 212

[56] References Cited
UNITED STATES PATENTS
3,366,789    1/1968    Allen ................................ 356/46 X Primary Examiner—James W. Lawrence
Assistant Examiner—T. N. Grigsby
Attorney, Agent, or Firm—Edward J. Kelly; Herbert Berl; Thomas R. Webb

[57] ABSTRACT

A standard tungsten filament lamp of known color temperature, operating at its standard filament voltage, is successively viewed by a photometer device comprising a series of radiation sensors, each responsive to a different segment of the spectral output of the lamp and shunted by a variable resistor, with the series connected to a display device capable of simultaneously displaying a series of time-sequential voltage signals. The variable resistors are adjusted for equal output, or straight line response, on the screen of the display device. Then, a tungsten filament lamp of unknown color temperature is substituted for the standard lamp, without changing the resistor adjustments, and the filament voltage of the lamp is adjusted to produce another straight line response on the display device screen, not necessarily at the same amplitude as for the standard lamp. Under these conditions the unknown lamp is operating at the same color temperature as the standard lamp.

6 Claims, 4 Drawing Figures

Patented Dec. 24, 1974

METHOD FOR COLOR TEMPERATURE CALIBRATION OF TUNGSTEN

BACKGROUND AND BRIEF SUMMARY OF THE INVENTION

An object of the present invention is to provide a quick and accurate method of color temperature calibrating a tungsten filament lamp.

The color temperature scale is based on the chromaticity of the light emitted by a black body at the freezing point of platinum, rhodium or iridium. These chromaticities can be duplicated closely by adjustment of the filament voltage applied. A lamp emitting light of the same chromaticity as a black body is said to have the same color temperature as the black body. Tungsten filament lamps, operated at specific color temperatures, are widely employed as standards of luminous intensity and luminance. In calibrating an unknown lamp, the problem is to determine what filament voltage is required to operate that lamp at a desired color temperature.

Color temperature calibration of such lamps has been accomplished in the past by visual comparison techniques. The method used by the National Bureau of Standards, and other calibration agencies, involves the use of a bar photometer with a Lummer-Brodhum Photometer Head. An operator makes a visual comparison of the unknown lamp with a color temperature standard lamp, by viewing both lamps in a split field and adjusting for equal luminance by moving closer to the lower intensity lamp. The results of this procedure can vary appreciably with a change of operators.

A second technique employs two photocells equipped with filters which transmit in the blue and red regions of the visible spectrum. A nulling circuit, consisting of a galvanometer and resistance boxes, establishes a ratio of signals obtained through the two filters with the photocells viewing the standard lamp. The unknown lamp is then viewed by the same photocells with the filament voltage adjusted until the signal ratio obtained is the same as the ratio obtained with the standard lamp. A disadvantage of this technique is that, due to the differences in light intensities of the two lamps for the same color temperature, greater or lesser photocell signals are often used to arrive at the same ratio. The ratio is also a function of the field of view of the photocells and will change with any movement of the photocells.

In accordance with the present invention, a standard lamp of known color temperature at a given filament voltage is successively viewed by a series of radiation sensors, each designed to respond to a different discrete band of the radiation spectrum. The sensors are electrically connected to a display device which separately displays the signals from the sensors, with an adjustable resistor shunting each sensor; and the various resistors are adjusted to produce equal outputs of the sensors on the display device (straight-line-response). Then, the standard lamp is replaced by a similar unknown lamp, and the filament voltage is adjusted to produce equal outputs on the display device. At this filament voltage, the unknown lamp has the same color temperature as the standard lamp, because two tungsten filament lamps operated at the same color temperature have identical spectral distrubitions. The greatest accuracy is obtained where the various sensors have an approximately equal response to an equal energy source.

The electrical signal from an illuminated sensor with no shunt resistor, may be expressed by $$\int_{\lambda_1-\frac{\Delta\lambda}{2}}^{\lambda_1+\frac{\Delta\lambda}{2}} f(\lambda)\cdot\omega(\lambda)d\lambda$$

where $f(\lambda)$ is the spectral distribution of the radiation, $\omega(\lambda)$ is the spectral efficiency (in %) of the sensor, $\lambda_1$ is the peak response wavelength of the sensor, and $\Delta\lambda/2$ is one half band pass of the spectral response of the sensor. When the sensor is shunted by a resistor of relatively low resistance, the sensor produces a substantially constant current electrical signal with a magnitude substantially proportional to the resistance of the resistor. In practising the present invention, the shunt resistors are adjusted to produce the following condition:

$$S_1 = R_1 \int_{\lambda_1-\frac{\Delta\lambda}{2}}^{\lambda_1+\frac{\Delta\lambda}{2}} f(\lambda)\cdot\omega_1(\lambda)d\lambda = S_2$$

$$= R_2 \int_{\lambda_2-\frac{\Delta\lambda}{2}}^{\lambda_2+\frac{\Delta\lambda}{2}} f(\lambda)\cdot\omega_2(\lambda)d\lambda \ldots$$

$$= S_n \int_{\lambda_n-\frac{\Delta\lambda}{2}}^{\lambda_n+\frac{\Delta\lambda}{2}} f(\lambda)\cdot\omega_n(\lambda)d\lambda.$$

Preferably, about eight sensors with roughly equal band pass characteristics, at peak frequencies distributed over the visible spectral range, are chosen. However, it will be understood that the invention may be used in other portions of the spectrum, e.g. in the infra-red or ultra-violet regions.

DETAILED DESCRIPTION OF A PREFERRED EMBODIMENT

Figure 1:
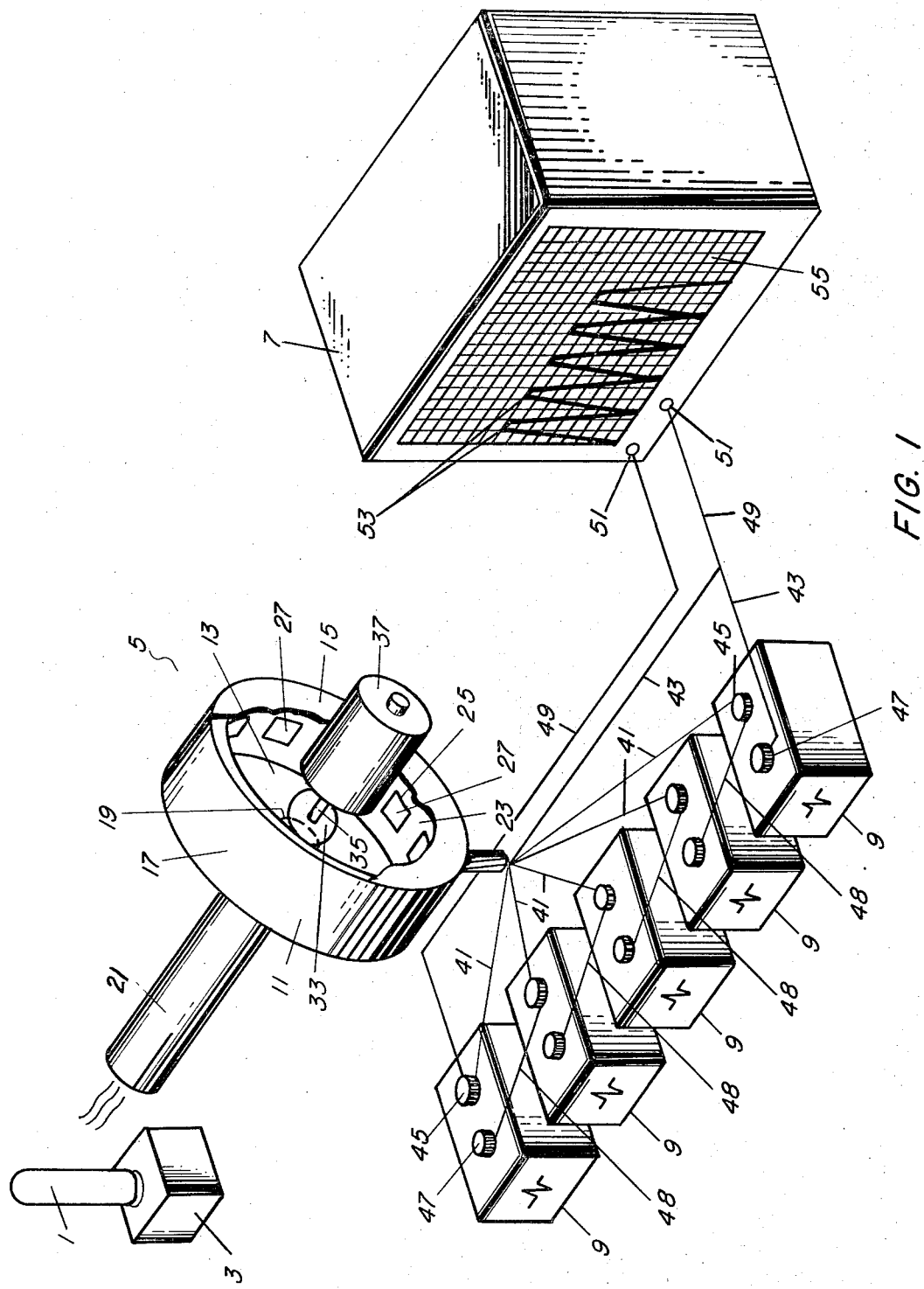
FIG. 1 is an isometric view of calibration apparatus used in practising the invention.

The calibration apparatus shown, as an example, in FIG. 1 includes a tungsten filament lamp 1, having a socket 3, a photometer 5 for viewing the lamp 1, a chart recorder 7 for displaying the outputs from photometer 5, and a series of variable resistance elements 9 for varying the outputs from the photometer 5.

Figure 2:
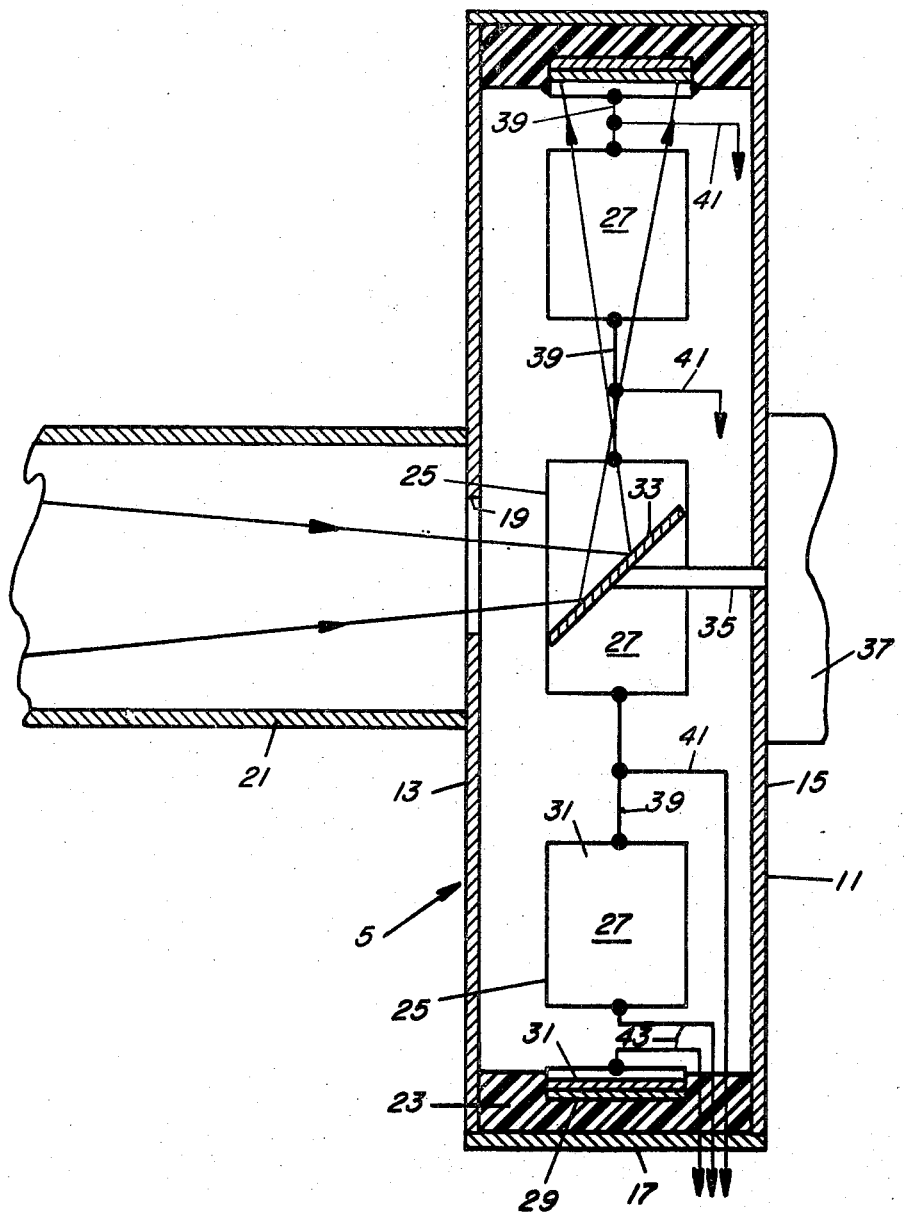
FIG. 2 is an enlarged axial section view of the photometer of FIG. 1.

The photometer 5, shown in more detail in FIG. 2, comprises a cylindrical housing 11, e.g. of metal, made up of two end plates 13 and 15 connected by a peripheral band 17. Plate 13 has a central opening 19 through which light from lamp 1 enters the housing 11. The photometer preferably has an elongated light shield tube 21 attached to plate 13 around the opening 19 and extending toward the lamp 1. An annular member 23 of plastic or other electrical insulating material is mounted in the housing 11 next to the band 17. Member 23 is formed with an annular series (preferably eight) of equally-spaced shallow recesses 25 each containing a light sensor 27 consisting of a high resistance photovoltaic cell 29 and a light transmitting filter layer 31. The sensors 27 are designed to respond primarily to light in different but roughly equal bandwidth segments of the visible spectral range, and sufficient sensors are provided to cover the entire visible range.

Figure 3:
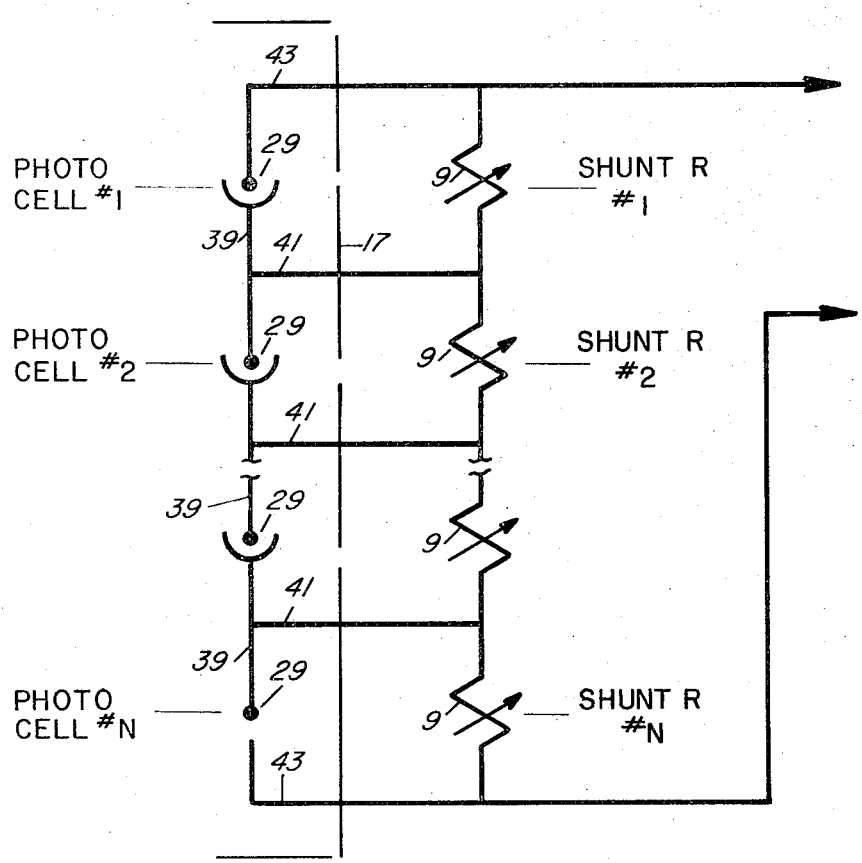
FIG. 3 is a circuit diagram of the connections for the photocells and shunt resistors of FIG. 1.

The light from lamp 1, through opening 19 and shield 21, is successively reflected to different ones of the sensors 27 by a 45° mirror 33 mounted on the shaft 35 of a constant-speed electric motor 37 which is mounted centrally on endplate 15. Adjacent photocells 29, except the first and last of the annular series, are electrically connected together by connectors 39 having insulated leads 41 brought out through the housing wall 17, as indicated in FIGS. 2 and 3. Also, two insulated leads 43 are brought out from the other sides of the first and last photocells. External to the housing 5, the leads 41 and 43 are connected to one of the sides 45 and 47 of the variable resistance elements 9, and the adjacent resistance elements 9 are connected in series by connectors 48, as shown in FIGS. 1 and 3, so that each photocell 29 is shunted by one of the variable resistance elements 9. The two end leads 43 are also connected by leads 49 to the signal input terminals 51 of the chart recorder 7. so that the photocell current and also the shunt resistor current will be substantially constant as the resistance element is varied. Under these conditions, the output current and voltage applied to the recorder will be substantially proportional to the shunt resistance. This can be shown as follows. In FIG. 3, assume that only Photo Cell No. 1 is illuminated. Let $R_p$, $R_s$ and $R_r$ be the resistances, and $i_p$, $i_s$, and $i_r$ be the currents, respectively of the photocell, shunt resistor and chart recorder. Then, since $R_p >> R_s$, and $R_p$ is substantially constant, $i_p$ will be determined primarily by $R_p$ and will be substantially constant. Since $R_r >> R_s$, and $R_r$ and substantially constant, $i_r$ will be very small and $i_s = i_p - i_r$ will be substantially constant. The voltage across the parallel chart recorder and the series of shunt resistors is:

$V_r = R_r i_r = 8 R_s i_s$, (for eight resistors), $i_r = 8 R_s (i_s/R_r) = R_s \times a$ constant (approximately)

or $i_r$ is substantially proportional to $R_s$.

In the method of the present invention, a standard tungsten filament lamp 1, of known color temperature is inserted into socket 3 and energized at its standard filament voltage to illuminate the mirror 33, and the mirror is rotated at a constant speed by motor 37. As the light beam impinges on (or sweeps over) each photocell-filter combination, the latter responds to its segment of the visible spectral range by generating a signal voltage that is transmitted to recorder 7 to produce a short line segment 53 on the screen 55 thereof, at an amplitude (height, as shown) which is proportional to the voltage applied thereto. If no shunt resistors 9 were used, the chart voltage would be the maximum response by the particular sensor involved to the light signal, and hence, would ordinarily be different for each sensor viewing the light beam, so that the line segments 53 would not lie in a horizontal straight line. A similar display of reduced amplitude is produced on the screen 55 with the sensors 27 shunted by resistors 9 of equal resistance. The next step in the method is to adjust the resistors 9 until the inputs of the individual sensors 27 to the recorder 7 are all equal, at some chosen amplitude, thus producing an easily-seen straight-line-response of line segments 53 on the screen 55.

Figure 4:
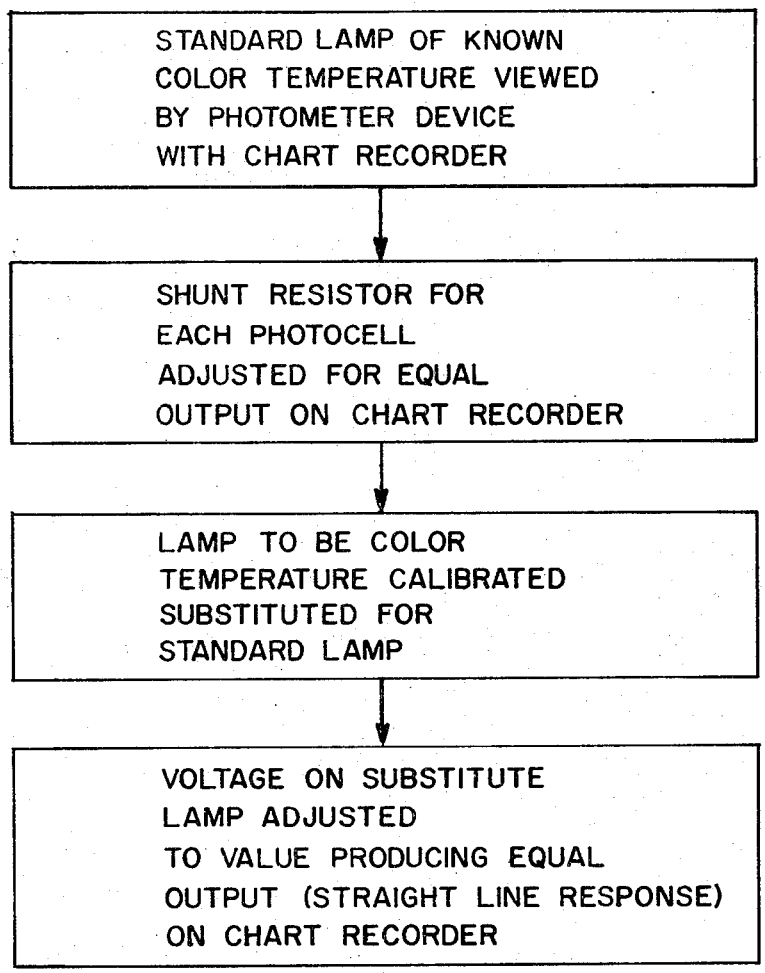
FIG. 4 is a flow chart for the invention.

Next, the tungsten filament lamp to be color temperature calibrated is substituted for the standard lamp, without changing the settings of the resistors 9; and the filament voltage of the lamp is adjusted to a value at which the unknown lamp produces equal recorder inputs, or a straight line response on the recorder screen 55. This new voltage value is the calibrated voltage at which the particular lamp must be operated to produce the desired color temperature. So calibrated, this lamp can now be used as a standard lamp. This method is briefly indicated by the flow chart of FIG. 4. It will be understood that the amplitude of the straight line response on the screen 55 will not necessarily be the same for the standard and unknown lamps, because of variations in light intensities of the two lamps for the same color temperature. However, the new calibration method is not affected by these variations, as are prior calibration methods.

Each photo-voltaic cell 29 may be replaced with a series combination of a high resistance photo-conductive cell or photo-tube with a voltage source, such as a battery. For use in the infra-red or ultra-violet regions of the spectrum, the filters 31 may be replaced by spectrally-selective converters for converting the incident radiation to visible light. The chart recorder 7 may be a conventional oscillograph with a long persistence fluorescent screen. Alternatively, the chart recorder could be replaced by the combination of a meter which sequentially records the series of voltages and a voltage comparator device which compares the voltages and indicates when they are all equal.

The foregoing disclosure and drawings are merely illustrative of the principles of this invention and are not to be interpreted in a limiting sense. I wish it to be understood that we do not desire to be limited to exact details of construction shown and described for obvious modifications will occur to a person skilled in the art.

What is claimed is:

1. A method for color temperature calibrating an unknown filamentary lamp, comprising the steps of:
    A. energizing a standard filamentary lamp at a predetermined voltage to cause said lamp to emit radiation of known color temperature;
    B. directing said radiation emitted by said standard lamp successively onto a series of radiation-sensitive sensors, with the sensors connected in series with an output comparing means, and each sensor shunted by a variable resistor, each sensor being adapted to respond to a different pass band of the radiation spectrum of said lamp to produce a corresponding indication on said means;
    C. adjusting each of said resistors while the associated sensor is exposed to said standard lamp to produce equal outputs from said means; and then
    D. replacing said standard lamp with said unknown lamp, energizing said unknown lamp from a variable voltage source, directing the radiation emitted from said unknown lamp successively onto said series of sensors, and adjusting the voltage of said source to a value which produces equal outputs from said means.

2. The method set forth in claim 1, wherein said lamps are tungsten filament lamps emitting light primarily in the visible range of the radiation spectrum, and said sensors are adapted to respond to different pass bands of said visible light.

3. The method set forth in claim 1, wherein each of said sensors comprises a high resistance photocell and a radiation-transparent filter adjacent to said photocell.

4. The method set forth in claim 3, wherein each photocell is a photo-voltaic cell.

5. The method set forth in claim 1, wherein said output comparing means is an oscillograph having a long-persistence fluorescent screen.

6. The method set forth in claim 1, wherein:
A. said lamps are similar tungsten filament lamps emitting light primarily in the visible range;
B. each of said sensors comprises a high resistance photo-voltaic cell and a light-transparent filter layer adjacent to said photocell; and
C. said output comparing means is an oscillograph having a long-persistent fluorescent screen capable of displaying said equal outputs as a straight line response.

* * * * *